United States Patent [19]
Ahn et al.

[11] Patent Number: 6,116,863
[45] Date of Patent: Sep. 12, 2000

[54] ELECTROMAGNETICALLY DRIVEN MICROACTUATED DEVICE AND METHOD OF MAKING THE SAME

[75] Inventors: Chong H. Ahn; Daniel J. Sadler, both of Cincinnati, Ohio; Wenjin Zhang, Newark, Calif.

[73] Assignee: University of Cincinnati, Cincinnati, Ohio

[21] Appl. No.: 09/087,294

[22] Filed: May 29, 1998

Related U.S. Application Data

[60] Provisional application No. 60/048,084, May 30, 1997.

[51] Int. Cl.[7] .................................................. F04B 17/00
[52] U.S. Cl. .................. 417/322; 417/413.1; 417/413.2; 417/413.3; 417/322
[58] Field of Search ................................ 417/322, 413.1, 417/413.2, 413.3

[56] References Cited

U.S. PATENT DOCUMENTS

| | | | |
|---|---|---|---|
| 5,129,794 | 7/1992 | Beatty | 417/413.1 |
| 5,171,132 | 12/1992 | Miyazaki et al. | 417/413.1 |
| 5,259,737 | 11/1993 | Kamisuki et al. | 417/322 |
| 5,336,062 | 8/1994 | Richter | 417/413 A |
| 5,401,974 | 3/1995 | Oae et al. | 250/492.2 |
| 5,417,235 | 5/1995 | Wise et al. | 137/1 |
| 5,452,878 | 9/1995 | Gravesen et al. | 251/129.02 |
| 5,529,465 | 6/1996 | Zengerle et al. | 417/413.2 |
| 5,593,134 | 1/1997 | Steber et al. | 251/129.17 |
| 5,619,177 | 4/1997 | Johnson et al. | 337/140 |
| 5,909,069 | 6/1999 | Allen et al. | 310/40 MM |
| 5,927,325 | 7/1999 | Bensaoula et al. | 137/599 |
| 5,955,659 | 9/1999 | Gupta et al. | 73/54.01 |

OTHER PUBLICATIONS

Jerman, Hal, "Electrically–activated, normally–closed diaphragm valves", *J. Micromech. Microeng*, (1994), pp. 210–216.

Yanagisawa, Keiichi et al., "An Electromagnetically Driven Microvalve", *The 7th International Conference on Solid–State Sensors and Actuators*, pp. 102–105.

*Primary Examiner*—Teresa Walberg
*Assistant Examiner*—Vinod D. Patel
*Attorney, Agent, or Firm*—Wood, Herron & Evans, L.L.P.

[57] ABSTRACT

A microactuated device and method of making the same in which an electromagnetic driver, overlapping a magnetically permeable diaphragm, is utilized to drive the microactuated device. Through the use of an electromagnetic driver to provide the motive force for a microactuated device, exceptional performance may be realized, e.g., with a substantially reduced drive voltage for micropumps, microvalves, and the like, and with stronger and more precise sensory outputs for microactuated sensors and the like. Moreover, by overlapping the electromagnetic driver over a diaphragm, a number of batch processing techniques, each of which is well suited for mass production, may be used in the fabrication of extremely compact and cost effective integrated devices.

52 Claims, 7 Drawing Sheets

ELECTROMAGNETICALLY DRIVEN MICROACTUATED DEVICE AND METHOD OF MAKING THE SAME

This application claims priority on U.S. Provisional Patent Application Ser. No. 60/048,084, filed May 30, 1997, which is incorporated by reference.

FIELD OF THE INVENTION

The invention generally relates to microelectromechanical system (MEMS) devices and methods of making the same, and more particularly, to micromachined and microactuated devices such as pumps, valves, sensors and the like.

BACKGROUND OF THE INVENTION

New applications and uses for microelectromechanical systems (MEMS) are continuously being developed. Many microelectromechanical systems typically include one or more microactuated devices that are machined into silicon wafers or other substrates in part using many of the batch fabrication techniques developed for fabricating electronic devices. Microactuated devices typically include movable members or components that either are driven by an electrical stimulus to perform mechanical tasks or are sensory elements that generate an input to an electronic system in response to a physical stimulus or condition. In addition, by virtue of the commonality of many manufacturing processes, control and other support electronics may also be fabricated onto the same substrates as the microactuated devices, thereby providing single chip solutions for many microelectromechanical applications.

For example, one general application of microelectromechanical systems is that of fluid delivery or regulation systems, e.g., in biomedical or biological applications such as portable or implantable drug delivery systems, biochemical analysis applications such as chip immuno sensors and portable gas chromatographs, air flow control applications such heating, ventilation and air conditioning systems, robotics applications such as effectors for microrobotic manipulators, food and pharmaceutical applications such as mass flow controllers, and micro fuel injectors and valving systems, among others.

A micropump, for example, is a microelectromechanical device suitable for use in the delivery of fluid between two ports. Similarly, a microvalve is a microelectromechanical device suitable for use in selectively permitting or blocking passage of a fluid through a port. Bidirectional peristaltic micropumps have also been developed which couple a pump actuator with two peristaltic microvalves. By controlling the exciting sequence of the two valves and the pump actuator, a pumping operation in either direction between two ports may be achieved.

Another general application of microelectromechanical systems is in sensors such as differential or absolute fluid or gas pressure sensors, accelerometers, and the like. In such applications, a microelectromechanical device may include a sensory member coupled to electronic processing components that sense movement of the sensory member.

However, it has been found that many conventional micropumps and microvalves require high drive voltages to attain adequate fluid delivery rates for many applications. For example, micropumps and microvalves have been developed that rely on electrostatic motive forces and require drive voltages of several hundred volts. If used in conjunction with conventional signal control or other processing electronics (whether or not on the same substrate), often a separate power supply or voltage regulator is required to drive such microelectromechanical devices, since most electronic processing devices operate in the range of 1–5 volts. Moreover, in many biomedical or biological applications a serious safety concern is raised with respect to such devices by virtue of the potential for electrical breakdown at high voltages. Furthermore, it has also been found that many microelectromechanical sensors provide low output levels that require delicate and highly complex electronics to adequately sense and process the sensory output of a sensory member.

Electromagnetic force has been used in other microelectromechanical systems such as micromotors and the like. In addition, it has been proposed to use electromagnetic force as a motive force in micropumps and microvalves. The proposed designs rely on an external electromagnetic coil wrapped around a fluid delivery tube in which has been mounted a soft metal diaphragm. Electromagnetic force is applied around the perimeter of the diaphragm by the external coil. However, the designs, and particularly the external coils utilized therein, are not well suited for batch processing, and thus are poorly adapted for mass production. Moreover, the designs are rather bulky in practice and are difficult to incorporate into integrated systems, thereby likely requiring additional support circuitry that further increases the overall size, cost and complexity of such systems.

SUMMARY OF THE INVENTION

The invention addresses these and other problems associated with the prior art in providing a microactuated device and method of making the same in which an electromagnetic driver, overlapping a magnetically permeable diaphragm, is utilized to drive the microactuated device. Through the use of an electromagnetic driver to provide the motive force for a microactuated device, exceptional performance may be realized, e.g., with a substantially reduced drive voltage for micropumps, microvalves, and the like, and with stronger and more precise sensory outputs for microactuated sensors and the like. Moreover, by overlapping the electromagnetic driver over a diaphragm, a number of batch processing techniques, each of which is well suited for mass production, may be used in the fabrication of extremely compact and cost effective integrated devices.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

DETAILED DESCRIPTION

Figure 1:
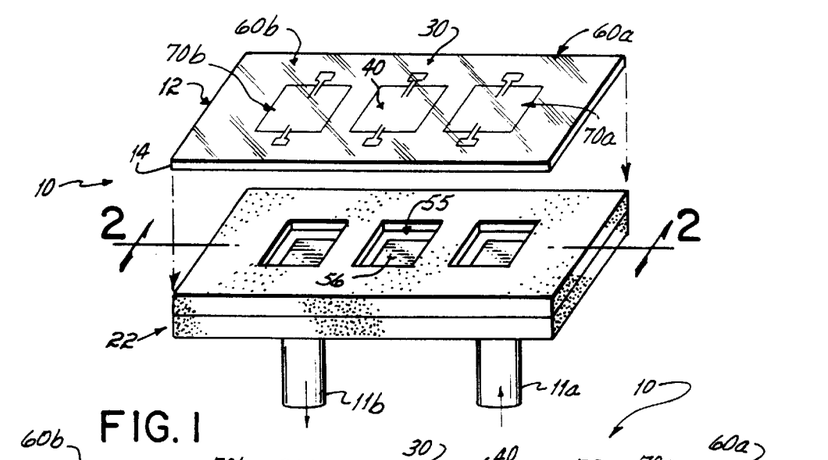
FIG. 1 is a partially-exploded schematic perspective view of an electromagnetically driven micropump consistent with the principles of the invention.

Turning to the Drawing, wherein like numbers denote like parts throughout the several views, FIG. 1 illustrates an electromagnetically driven micropump 10 consistent with the principles of the invention. In general, it should be appreciated that the invention may find applicability in a wide variety of other microactuated devices besides micropumps which utilize movable diaphragms, including microvalves, bio-magnetic particle separators, and microactuated sensors such as differential and absolute gas and fluid pressure sensors, accelerometers, etc., among others. Therefore, while much of the disclosure hereinafter will focus on micropumps and microvalves for use therein, it should be understood that the invention is not limited solely to such applications.

Micropump 10 generally includes an electromagnetic driver assembly 12 bonded to a pump body assembly 22, with the micropump 10 functionally separated into a pump actuator 30 and two peristaltic microvalve actuators 60a, 60b, each of which includes components on each assembly 12, 22.

Each valve 60a, 60b has associated therewith one of a pair of inlet/outlet tubes 11a, 11b. Depending upon the sequence in which pump 30 and valves 60a, 60b are actuated, bidirectional pumping may be selectively generated, such that in one mode tube 11a functions as an inlet and tube 11b functions as an outlet, and in the other mode the flow through tubes 11a, 11b is reversed.

Figure 2:
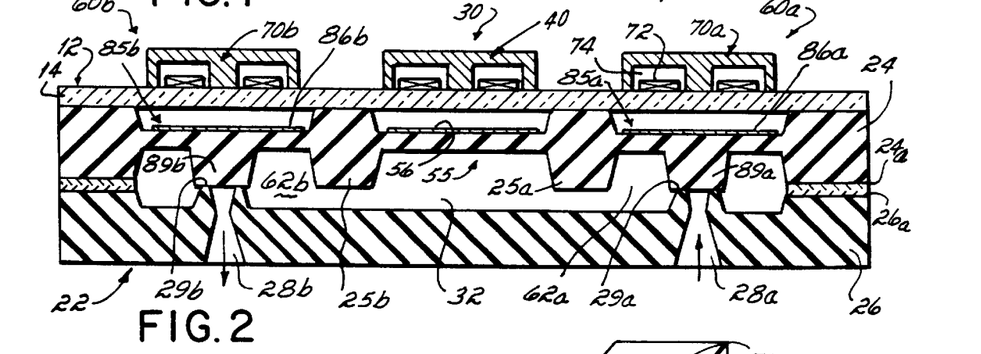
FIG. 2 is a schematic cross-sectional view of the micropump of FIG. 1, taken along lines 2—2, and with the inlet/outlet tubes removed.

As shown in FIG. 2, electromagnetic driver assembly 12 includes electromagnetic drivers 40, 70a and 70b, disposed on a substrate 14, which selectively generate magnetic fields for actuating each of pump 30 and valves 60a, 60b. Drivers 40, 70a and 70b are illustrated as planar spiral-type inductors, which have been found to have a favorable structural affinity to the structure of micropumps, microvalves, and several other microactuator designs which utilize a vertical actuation of a diaphragm (where a vertical actuation is generally considered to be a movement of the surface of a diaphragm in a direction generally perpendicular to the plane formed by the diaphragm). A spiral-type inductor has been found to provide high inductance, low coil resistance, and low magnetic field interference. In a spiral-type inductor structure, if high permeability magnetic cores are utilized to encapsulate spiral coils forming a closed magnetic circuit, the achievable inductance value has been found to increase due to the low reluctance of the interlinked magnetic circuit between the coils and the cores.

Drivers 40, 70a and 70b utilize semi-encapsulated magnetic cores to minimize magnetic field interference and thereby confine the magnetic fluxes in the closed magnetic core. Unlike fully-encapsulated magnetic cores, however, each driver is open facing pump body assembly 22, with a magnetic path completed for each driver through a magnetic core formed on an associated diaphragm 55, 85a, 85b on pump body assembly 22 (discussed hereinafter). The magnetic forces generated in this microactuator design depend on the variation of magnetic reluctance through this magnetic path, including air gaps.

Figure 3:
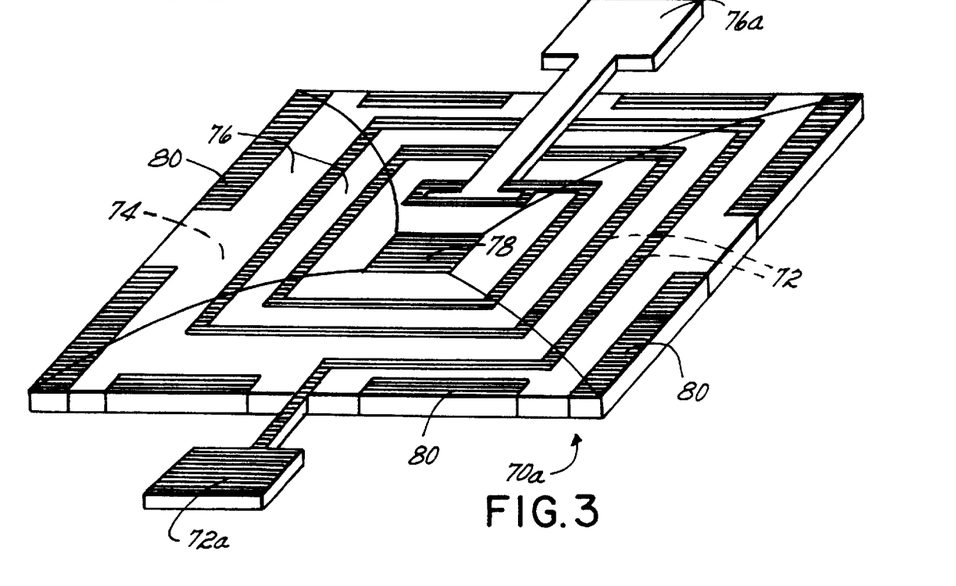
FIG. 3 is a schematic perspective view of an electromagnetic driver from the micropump of FIG. 1.

FIG. 3 schematically illustrates electromagnetic driver 70a of valve 60a in greater detail. Drivers 40 and 70b may be similarly configured, although the relative dimensions thereof to provide differing field strengths may be varied between each driver.

Driver 70a includes a spiral coil 72 of conductive material which is encapsulated by an overlapping magnetically permeable core 76. An insulator layer 74 interposed therebetween generally insulates coil 72 from core 76, with a central via 78 and plurality of peripheral vias 80 formed in insulator layer 74 to allow core 76 to be anchored to the substrate and to provide a path to guide magnetic flux toward the associated diaphragm. It should be appreciated that coil 72 will ordinarily not be visible through coil 76 as it is shown in FIG. 3, but is shown as such in the Fig. to facilitate an understanding of one suitable configuration for the coil. The reader should instead refer to FIGS. 4A–4G discussed below for a better understanding of the relative placement of the various components in the driver.

Coil 72 includes an outer lead wire 72a and an inner lead wire 76a across which an electric potential is applied to generate a magnetic field for actuating valve 60a. As will become apparent from the later discussion of the method of manufacturing driver 70a, outer lead wire 72a to coil 72 may be contiguous with and formed of the same conductive material forming the coil. However, it has been found to simplify manufacture if inner lead wire 76a (which is required to extend over the coil) is instead formed of the same magnetically permeable material as core 76. Through appropriate patterning during deposition of core 76, lead wire 76a may also be deposited to electrically connect to the inner end of coil 72, yet remain electrically insulated from the core. In the alternative, lead wire 76a may be formed from the conductive material forming coil 72, although additional processing steps and masks would be required.

Returning to FIG. 2, pump body assembly 22 as illustrated is formed from two substrates 24, 26, which provide the pump body for pump 30 and the valve bodies for valves 60a, 60b. Substrate 24 is used to form diaphragms 55, 85a, 85b and central bosses 89a, 89b, and substrate 26 is used to form valve seats 29a, 29b, flow channels or chambers 32, 62a, 62b, and inlet/outlet ports 28a, 28b. In addition, substrate 24 defines a pair of chamber partitions 25a, 25b defining micro flow channels which limit flow between chambers 32, 62a, 62b.

Each diaphragm 55, 85a, 85b includes a magnetic core 56, 86a, 86b which closes the magnetic path with its associated driver 40, 70a, 70b. Furthermore, for valves 60a, 60b, each diaphragm 85a, 85b also includes a central boss 89a, 89b opposite its associated core 86a, 86b which mates to a valve seat 29a, 29b on substrate 26, thereby forming normally closed diaphragm valves. When a current is applied to one of drivers 40, 70a, 70b, the associated diaphragm 55, 85a, 85b is attracted toward the driver. In the case of pump 30, the effective volume of chamber 32 is increased. In the case of each valve 60a, 60b, valve bosses 89a, 89b are unseated from valve seat 29a, 29b to thereby open the associated valve. It should be appreciated, however, that normally open valves may be utilized in the alternative.

In use, flow may be induced from port 28a to port 28b by sequentially actuating driver 70a, driver 40 and driver 70b in a repeating sequence to achieve sequential peristaltic micropump action. Flow may be induced from port 28b to port 28a by sequentially actuating 70b, driver 40 and driver 70a in a similar, but reverse fashion.

Method of Manufacture

To construct a micropump or other microactuated device, an electromagnetic driver on a first substrate (e.g., a Pyrex glass wafer) and a diaphragm and other mechanical components on a second substrate (e.g., a silicon wafer) may be separately fabricated in part utilizing conventional wafer processing and/or bulk micromachining techniques, and then may be assembled together using low temperature wafer bonding techniques. This new fabrication technique of microactuator devices using low temperature bonding techniques provides a flexible and unique approach in realizing various MEMS devices.

Electromagnetic Driver Assembly

FIGS. 4A–4G illustrate one manner of fabricating electromagnetic driver assembly 12. In this example, a three-mask photoresist process is utilized, although other processes may be utilized in the alternative. Moreover, it should be appreciated that the side cross-sectional view of the assembly illustrates only the electromagnetic driver components of microactuated valve 60a, and thus, the reader may also refer to FIG. 3 as an illustration of the driver components formed in this process. Typically, valve 60b and microactuated pump 30 are fabricated concurrently with valve 60a, and thus, the same fabrication steps may be used to construct these other components.

The drivers and other components on assembly 12 are disposed on a non-magnetically permeable inductor substrate 14, which may be formed from an insulator material which is transparent to magnetic flux, e.g., glass, various plastics, alumina, etc. In the alternative, substrate 14 may be a semiconductor material such as silicon (e.g., as in the embodiment illustrated in FIGS. 8 and 9), aluminum gallium arsenide, silicon carbide, etc. Moreover, substrate 14 may be utilized in wafer form so that conventional wafer processing may be performed and so that batches of assemblies 14 may be concurrently produced from the same wafer. In the illustrated embodiment, substrate 14 is Pyrex 7740 glass provided on a 2 inch (5.1 cm) diameter 10 mil (250 micron) thick wafer.

Figure 4A:
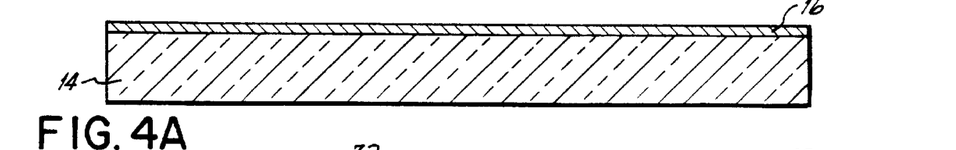
FIGS. 4A–4G are schematic cross-sectional views illustrating the fabrication of the electromagnetic driver of FIG. 3.

As shown in FIG. 4A, a seed layer 16 is initially deposited on substrate 14, typically through successive deposition of one or more metal layers, e.g., via electron beam evaporation or another suitable metal deposition process. Seed layer 16 may include, for example, titanium (300 Å)/copper (3000 Å)/titanium (300 Å), or any other composition which adequately promotes electroplating of the metal used for the spiral coil (here, copper). One suitable alternate seed layer includes, for example, chromium (300 Å)/copper (3000 Å)/chromium (200 Å).

Figure 4B:
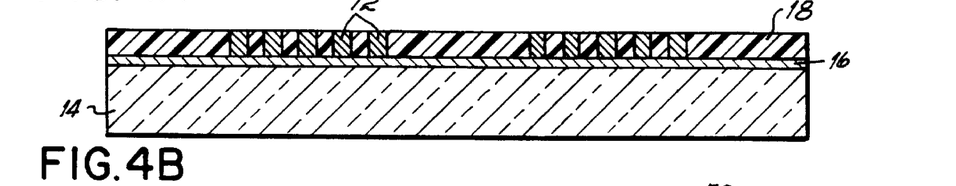
Figure 4C:
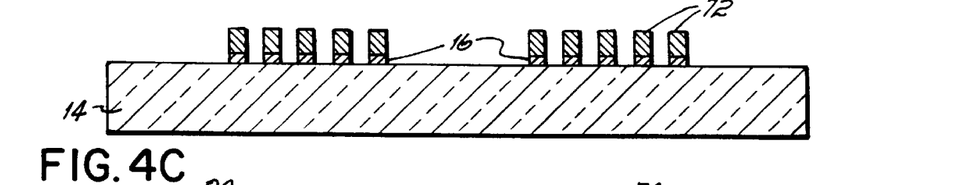

Next, as shown in FIG. 4B, a photoresist is deposited and patterned to form a mask 18 for plating the coil for each driver, typically also including the outer lead wire therefor. In the illustrated embodiment, for example, AZ-4000 series positive photoresist, available from Hoechst Celanese Corp., is used in a LIGA-type (photolithographic) process to produce a high aspect ratio, 25 micron thick, electroplating mold. In addition, the top titanium layer in seed layer 16 is removed via chemical wet etching and a conductive material such as copper is electroplated through the photoresist mask 18 to form coil 72 and lead wire 72a (FIG. 3). Electroplating may be achieved for example by attaching a copper plate to the anode of a current source, attaching the wafer to the cathode, and immersing both in an electrolytic solution while a pulsed current of 50 mA is applied. Next, as shown in FIG. 4C, mask 18 is stripped with acetone, and seed layer 14 is removed via chemical wet etching to isolate the spiral coil segments from one another.

In one embodiment coil 72 may be patterned to include 51 segments and 12 full turns in a surface area of 4 mm × 4 mm, with line widths of 50 microns, line thicknesses of 25 microns, and line spacings of 30 microns. Other configurations, and dimensions for coil 72 may be used in the alternative.

Figure 4D:
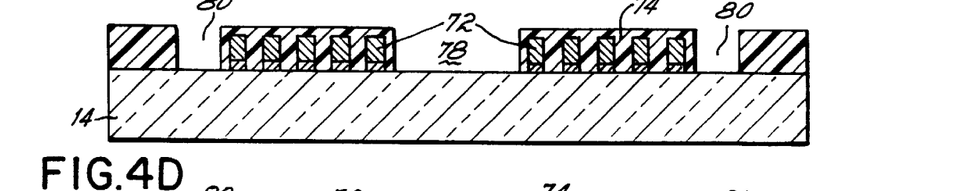

Next, as shown in FIG. 4D, a photoresist such as AZ-4000 is deposited on the spiral coil (e.g., by spin coating), patterned for conductor via holes (e.g., via holes 78 and 80), and then cured at an elevated temperature (e.g., 150° C. for 1 hour) to form insulator layer 74 as a planarized layer.

Figure 4E:
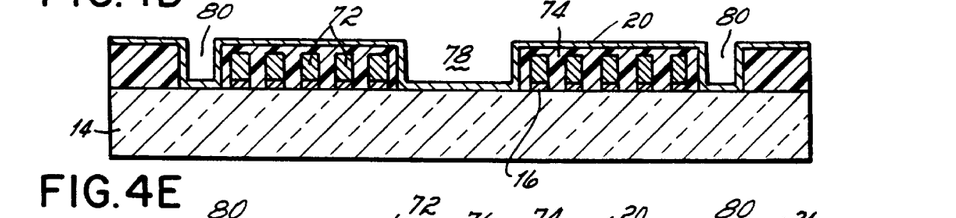
Figure 4F:
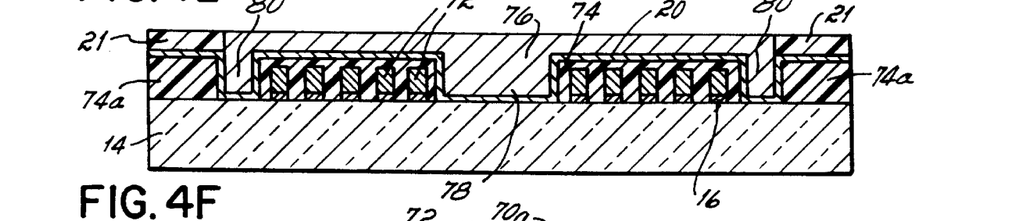

Next, as shown in FIGS. 4E–4F, the magnetic core 76 is deposited in a similar process to that of coil 72. As shown in FIG. 4E, a second seed layer 20, e.g., titanium (300 Å)/copper (3000 Å)/titanium (300 Å) or chromium (300 Å)/copper (3000 Å)/chromium (200 Å), is deposited on the cured photoresist insulator layer 74 to promote electroplating of the top magnetic core.

Next, as shown in FIG. 4F, a third photoresist layer is deposited and patterned to form a mask 21. Further, the top titanium layer in seed layer 20 is removed via chemical wet etching and core 76, as well as inner lead wire 76a and vias 78, 80, are deposited via electroplating a magnetically permeable material, e.g., a 25 micron thick layer of Ni—Fe (81%/19%) permalloy. Electroplating may occur under similar conditions to that for plating coil 72, except that a Nickel anode and different electrolytic solution may be used.

The Ni—Fe (81%/19%) permalloy used for core 76 is saturated at about 0.7 Tesla with a relative permeability of about 800. Other magnetically permeable materials, e.g., with relative permeabilities greater than or equal to about 2000, such as other permalloy compositions (e.g., Ni—Fe—Co) as well as other sputtered, plated, or otherwise deposited soft magnetic filaments, etc., may be used in the alternative.

Figure 4G:
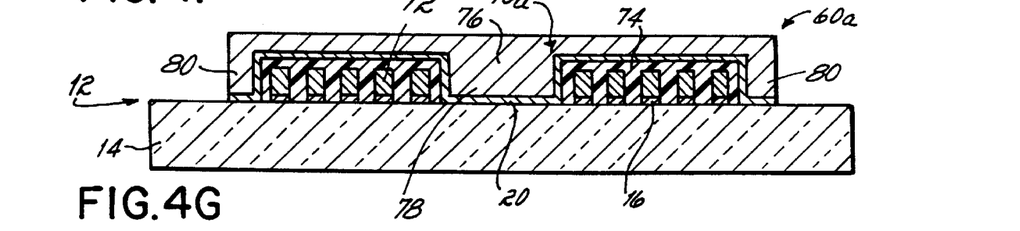

Next, as shown in FIG. 4G, photoresist mask 21, seed layer 20, and exposed portions 74a (see FIG. 4F) of insulator layer 74 are removed, in part to expose lead wire 72a as well as to electrically isolate a number of driver components coated with the seed layer. Fabrication of electromagnetic driver assembly 12 is then complete.

Pump Body Assembly

FIGS. 5A–5D illustrate one manner of fabricating pump body assembly 22. In this process, a pair of substrates are bonded together to form the pump body components. As will be discussed later, however, it should be appreciated that assembly 22 may alternately be formed from a single substrate consistent with the invention.

Figure 5A:
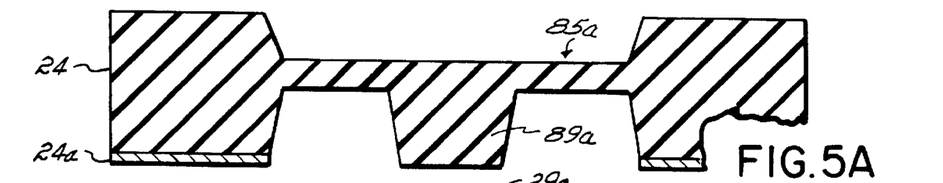
FIGS. 5A–5D are schematic cross-sectional views illustrating the fabrication of a pump body from the micropump of FIG. 1.
Figure 5B:
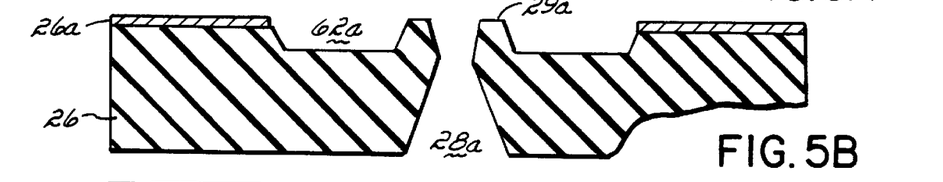

As shown in FIGS. 5A and 5B, a pair of substrates 24, 26 is utilized in assembly 22. Each substrate 24, 26 may be a non-magnetically permeable material, e.g, a semiconductor material such as silicon, aluminum gallium arsenide, silicon carbide, etc. In the alternative, either substrate may be formed from an insulator material, and further, it should be appreciated that various insulator, semiconductor, and conductive layers may be deposited on either substrate in some embodiments. For example, it may be desirable to integrate control electronics for the micropump on a different area of substrate 24 using conventional fabrication processes. Moreover, it should be appreciated that substrates 24, 26 may be utilized in wafer form so that conventional wafer processing may be performed and so that batches of assemblies may be concurrently produced from the same wafers. In the illustrated embodiment, for example, substrates 24, 26 are 2 inch (5.1 cm) diameter 12 mil (250 micron) thick silicon wafers coated with 1 micron of silicon dioxide.

As shown in FIG. 5A, diaphragms (e.g., diaphragm 85a) and central bosses (e.g., boss 89a) are formed in substrate 24 using bulk anisotropic etching techniques in KOH solution. To provide an actuation gap between glass substrate 14 and the silicon diaphragms, 30 microns of silicon may be etched from the top of the diaphragm. With the bottom of the diaphragm etched 20 microns, an ultimate diaphragm thickness of about 10 microns may be provided. It should be appreciated that the thickness of the diaphragm as well as other dimensions may be varied, e.g., to vary the flexibility and/or extent of travel of the diaphragm.

Similarly, as shown in FIG. 5B, valve seats (e.g., seat 29a), flow channels or chambers (e.g., chamber 62a), and inlet/outlet ports (e.g., port 28a) are formed in substrate 26 using bulk anisotropic etching techniques in KOH solution. It should be appreciated that the dimensions of these components will vary depending upon the desired flow characteristics for the micropump.

In one embodiment, diaphragms 55, 85a and 85b may have a size of 8 mm×8 mm, with micro flow channels defined by partitions 25a, 25b (FIG. 2) having a size of 1000 microns×200 microns, and with inlet/outlet ports 28a, 28b having a size of 500 microns by 500 microns. Other dimensions may be utilized consistent with the invention.

Figure 5C:
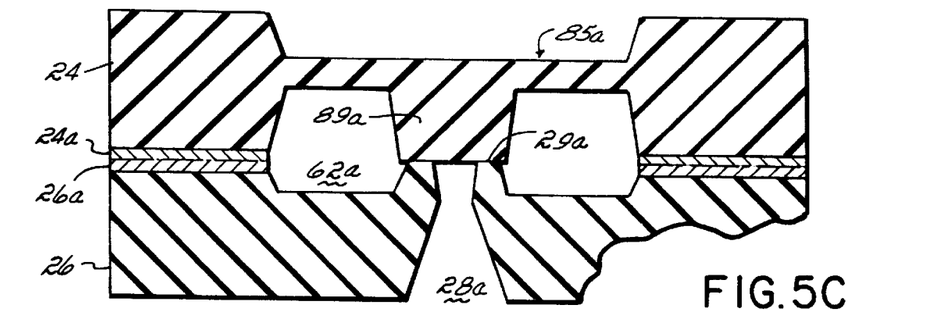

To bond substrates 24, 26 together, a eutectic bonding process is utilized whereby the mating surface of each substrate 24, 26 is initially coated with a conductive layer 24a, 26a (see FIGS. 5A and 5B). For example, photoresist may be deposited and patterned to form a mask exposing the mating surfaces of each substrate, then a titanium (300 Å)/gold (3000 Å) layer may be deposited on each substrate using electron beam evaporation. Next, as shown in FIG. 5C, substrates 24, 26 are bonded together at elevated temperature and pressure, e.g., at 380° C. for 10 minutes. Other bonding processes may be used in the alternative, e.g., silicon/silicon fusion bonding, or silicon/glass/silicon bonding, among others.

Figure 5D:
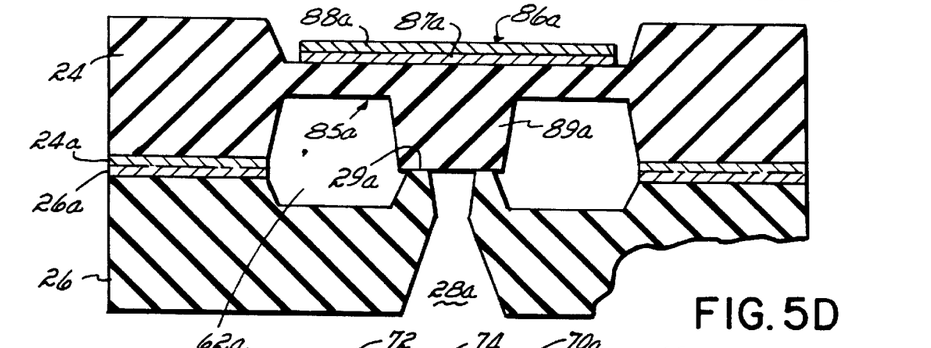

Upon the completion of bonding, magnetically permeable material is deposited on each diaphragm to form magnetic cores for closing the magnetic circuits with each driver on assembly 12. The process for forming the magnetic cores may be substantially the same as that used to form the magnetic core for each electromagnetic driver. For example, as shown in FIG. 5D, an initial seed layer 87a, e.g., titanium (300 Å)/copper (3000 Å)/titanium (300 Å) or chromium (300 Å)/copper (3000 Å)/chromium (200 Å), may be deposited via electron beam evaporation onto the top of each diaphragm (e.g., diaphragm 85a). A photoresist may then be deposited and patterned to form a mask (not shown) exposing the magnetic core on each diaphragm, and a magnetically permeable material 88a, e.g., Ni—Fe (81%/19%) permalloy, may be electroplated on the diaphragms, e.g., to a thickness of 7 microns, thereby forming a permalloy/silicon diaphragm. It should be appreciated, however, that different materials, processes and dimensions may be utilized to form the magnetic cores, e.g., to vary the flexibility or attractiveness of the diaphragms.

Assembly Bonding

After both assemblies 12, 22 are fabricated, the assemblies may be bonded together using low temperature bonding techniques. For example, using electrostatic bonding, the assemblies 12, 22 may be laminated together under heat and pressure with an electric potential (e.g., about 300 V) applied across the interface therebetween. Other processes for bonding silicon to glass may be used in the alternative, and moreover, it should be appreciated that yet other processes may be utilized should alternate substrate materials be used for either assembly.

Figure 6:
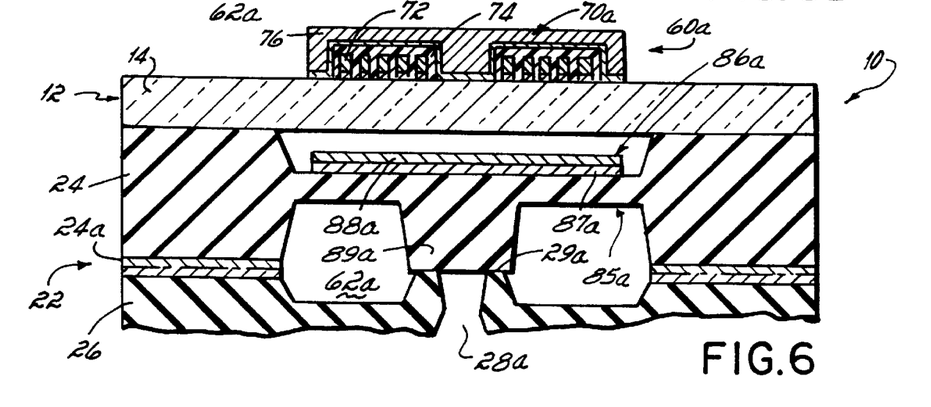
FIG. 6 is a schematic cross-sectional view illustrating the bonding of the electromagnetic driver of FIGS. 4A–4G with the pump body of FIGS. 5A–5D.

Following bonding of the assemblies, the wafers may be diced into separate chips. Subsequently, glass pipes or other fittings (e.g., pipes 11a, 11b shown in FIG. 1) may be attached to the inlet/outlet ports of each device. A completed micropump 10 is shown in FIG. 6.

Working Example

Figure 7:
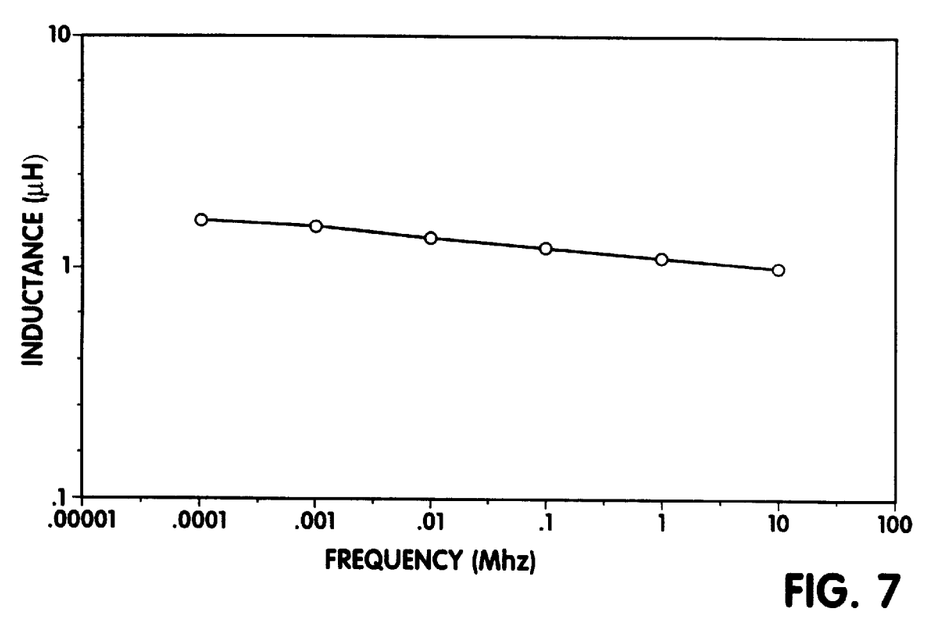
FIG. 7 is a graph illustrating the inductance as a function of frequency of an exemplary electromagnetic driver constructed consistent with the principles of the invention.

Several glass wafers were fabricated using the process steps discussed above in connection with FIGS. 4A–4G to produce 20-turn inductors of 8 mm—8 mm in area. To evaluate the fabricated inductors, the glass wafers were diced into chips, and the chips were mounted on ceramic packages. The inductance of the devices were measured using an Hewlett Packard HP-4192A impedance analyzer, resulting in a typical inductance of approximately 1.7 $\mu$H at 10KHz. A typical measured inductance versus frequency is plotted in FIG. 7. The measured conductor resistance was approximately 3 ohms which allows a high exciting current with even low driving voltage less then 3 volts.

A preliminary pumping test was also performed for a micropump fabricated in accordance with the process steps discussed above in connection with FIGS. 4A–4G, 5A–5D and 6 using DI water supplied through inlet and outlet glass pipes with inside diameters of approximately 1.5 mm. Using a power MOSFET micropump driving circuit, three phase square waves were applied to the pump in keeping the exciting sequence to achieve sequential peristaltic micropump action. The pumping flow rate of the pump was evaluated by measuring thee total amount of pumped fluid for a given duration at a fixed driving frequency. The measurements were repeated over a frequency range of diaphragm actuation from 1 Hz to 20 Hz. A maximum flow rate of 20 $\mu$L/min was attained at 5 Hz. By changing the phase firing order in reverse, the direction of pumping flow was also changed in reverse achieving a bidirectional micropump finction.

Alterative Embodiments

Various modifications may be made to the illustrated embodiments without departing from the spirit and scope of the invention.

Figure 8:
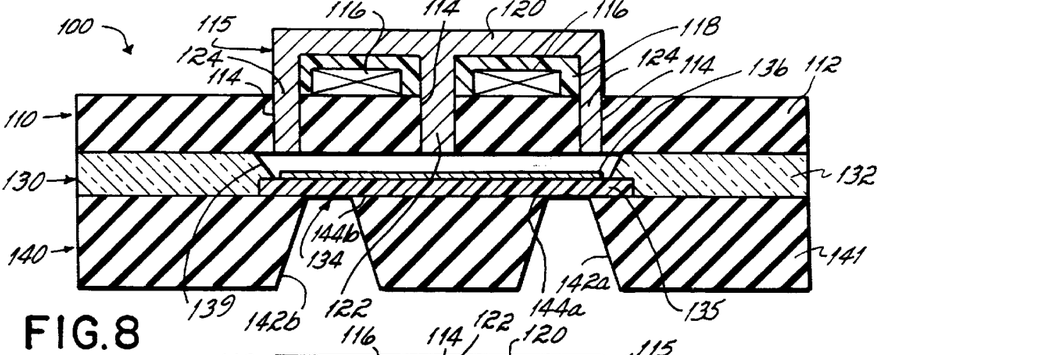
FIGS. 8 and 9 are schematic cross-sectional views of a microvalve consistent with the principles of the invention, shown respectively in closed and open configurations.
Figures 9, 10A:
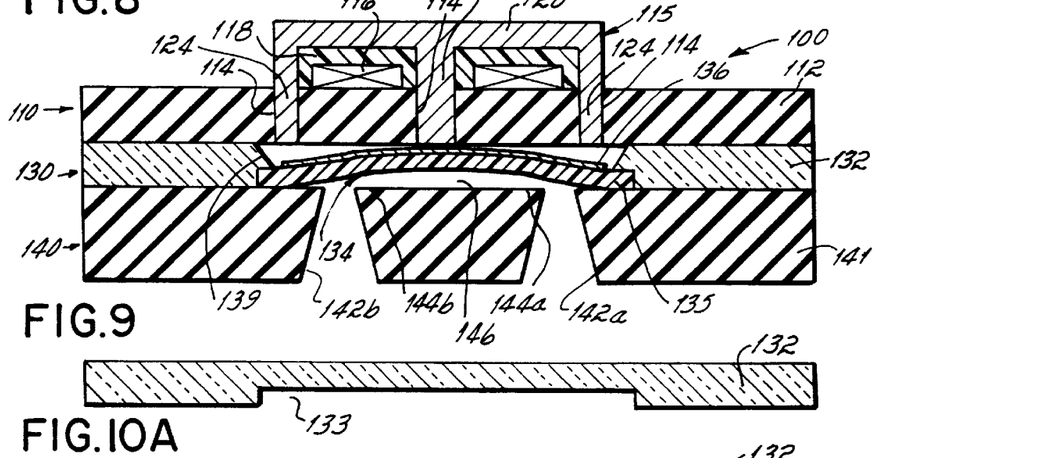
FIGS. 10A–10F are schematic cross-sectional views illustrating the fabrication of a diaphragm from the microvalve of FIGS. 8 and 9.

For example, FIGS. 8 and 9 illustrate a microvalve 100 incorporating several modifications to the microvalves incorporated in micropump 10 above. Microvalve 100 is formed from three assemblies, an electromagnetic driver assembly 110, diaphragm assembly 130 and valve body assembly 140 there assemblies 130 and 140 together perform the primary functions of the pump body assembly 22 of micropump 10). An electromagnetic driver 115, including coil 116, insulator layer 118 and magnetic core 120, is provided on assembly 110. A magnetic diaphragm 134 is provided on assembly 130, and pairs of inlet/outlet ports 142a, 142b and valve seats 144a, 144b, are provided on assembly 140. In lieu of a central boss, microvalve 100 illustrates that diaphragm 134 itself may include a generally planar surface facing away from the driver that is capable of seating on the valve seats.

FIG. 8 illustrates diaphragm 134 in a first, closed operative position. FIG. 9 illustrates diaphragm 134 in a second, open operative position, in which a valve chamber or conduit 146 is formed to place ports 142a and 142b in fluid communication with one another when diaphragm 134 is attracted to driver 115 and oriented in the second operative position.

Electromagnetic driver assembly 110 is similar in design to assembly 12 of micropump 10, with a few notable exceptions. A silicon substrate 112 is utilized in lieu of a glass substrate. Moreover, a plurality of through holes 114 are formed in the substrate to permit the magnetic core 120 of electromagnetic driver 115 to extend as vias 122, 124 partially or completely through substrate 112. While a glass or similar substrate may still be used in conjunction with through holes, it has been found that the formation of through holes in silicon or a similar substrate is often less problematic.

Fabrication of assembly 110 is also similar to that of assembly 12, except that, prior to fabricating driver 115 on the surface of substrate 112, through holes 114 may be etched through the substrate and filled with magnetically permeable material. For example, suitable through holes 114, positioned essentially proximate the termination of the vias in driver 115, may be formed through a photoresist mask via conventional wet or dry etching, either through one or both sides of the substrate. In the alternative, any of a number of alternate etching, drilling or laser ablation processes may be used.

Once the through holes are formed, magnetically permeable material, e.g., Ni—Fe(81%/19%) permalloy, may be plated into the holes, e.g., using the above-described seed layer deposition, photoresist masking, and electroplating processing steps used to deposit the magnetic core in assembly 12. Subsequent to electroplating of the through holes, the remaining steps in fabricating the electromagnetic drivers on assembly 12 may be utilized to fabricate driver 115 on assembly 110. As a result, the central and peripheral magnetic vias 122, 124 extend fully through substrate 112.

The extension of the magnetic vias through substrate 112 substantially reduces the gap between the magnetic core of the driver and that of the diaphragm, e.g., from about 300 microns in assembly 12 to only about 30 microns in assembly 110. As a result, it has been found that leakage of magnetic flux is reduced, and thus better encapsulation and a stronger attractive force between the driver and diaphragm is provided. Further, it should be appreciated that the amount by which the magnetic core extends through and surrounds the substrate, as well as the gap to the magnetic diaphragm, may be varied to provide different degrees of efficiency and attractive force.

Diaphragm assembly 130 utilizes polyimide as a base layer for diaphragm 134 in lieu of silicon. Polyimide has that advantage of comparatively greater flexibility than silicon, thereby providing a more flexible diaphragm for a given diaphragm thickness. A polyimide diaphragm may be formed on a silicon substrate (e.g., for substrate 24 of assembly 22, using a conventional back etching process to etch away the sacrificial silicon base upon which the polyimide would be initially deposited). However, in the illustrated embodiment, a glass substrate is instead utilized as it is easily bonded via electrostatic bonding to silicon substrate 141 from assembly 140.

Figures 10B, 10C:
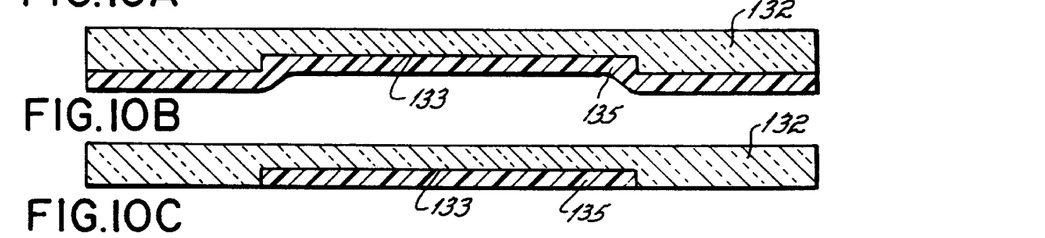
Figure 10D:
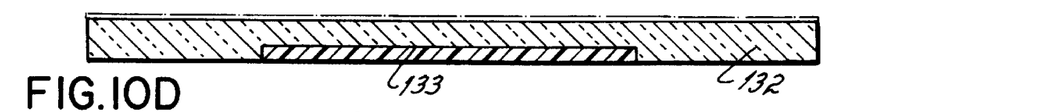
Figures 10E, 10F:
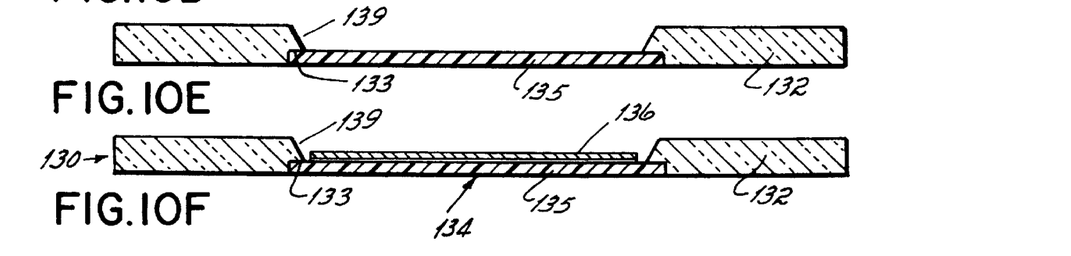

One suitable process for fabricating diaphragm assembly 130 is illustrated in FIGS. 10A–10F. As shown in FIG. 10A, a first recess 133 is etched on one side of a Pyrex glass substrate 132 via chemical wet etching. Next, as shown in FIG. 10B, a photosensitive polyimide material 135 is spin coated on the same side of the substrate to substantially fill recess 133, then is patterned, cured and washed (FIG. 10C) to form the base layer of diaphragm 134. Next, as shown in FIG. 10D, the opposing side of the glass substrate 132 is optionally polished to reduce the overall thickness of the substrate (e.g., to reduce the gap between the driver and the diaphragm), then in FIG. 10E a second recess 139 is etched in opposing side of glass substrate 132 to expose the polyimide material 135 and thereby suspend diaphragm 134 across the gap formed by recesses 133, 139. Next, as shown in FIG. 10F, a magnetic core 136 is deposited on polyimide material 135 in the same manner as magnetic core 86a on assembly 22.

Returning to FIGS. 8 and 9, valve body assembly 140 is formed from one silicon substrate 141 which is anisotropically etched from one or both sides to form inlet/outlet ports 142a, 142b. Assemblies 110, 130 and 140 may then be assembled using a eutectic bonding process. For example, similar to the bonding of assemblies 12, 22 of micropump 10, assemblies 110 and 130, and 130 and 140, may be bonded together using the above-described electrostatic bonding process. While all three assemblies may be bonded concurrently, typically the assemblies are bonded together sequentially.

As illustrated in FIG. 8, diaphragm 134 isolates ports 142a, 142b by seating against each of valve seats 144a, 144b when in its first, closed operative position. Also, as illustrated in FIG. 9, a channel is formed between inlets 142a, 142b when diaphragm 134 is in its second, open operative position. It should be appreciated that a boss is not required in this design—instead, the side of the diaphragm facing away from the driver is generally planar throughout. Moreover, it has been found that the potential for "dead volumes" within the internal chambers of a pump or valve body is reduced by the illustrated configuration. It may be desirable to minimize dead volumes to inhibit the stagnation and/or collection of materials disposed in the fluid disposed within the internal chambers, e.g., to inhibit bacteria growth within the internal chambers.

Figure 11:
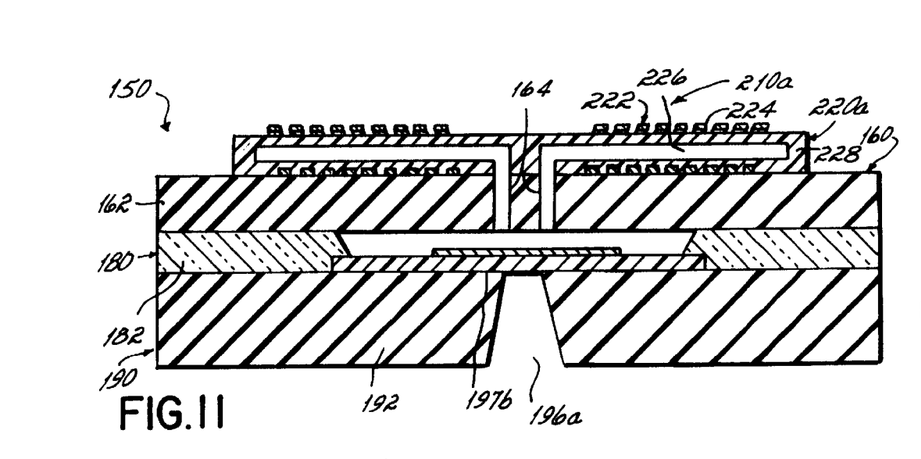
FIGS. 11 and 12 are schematic cross-sectional views of another micropump consistent with the principles of the invention, taken respectively from right and front sides thereof.
Figure 12:
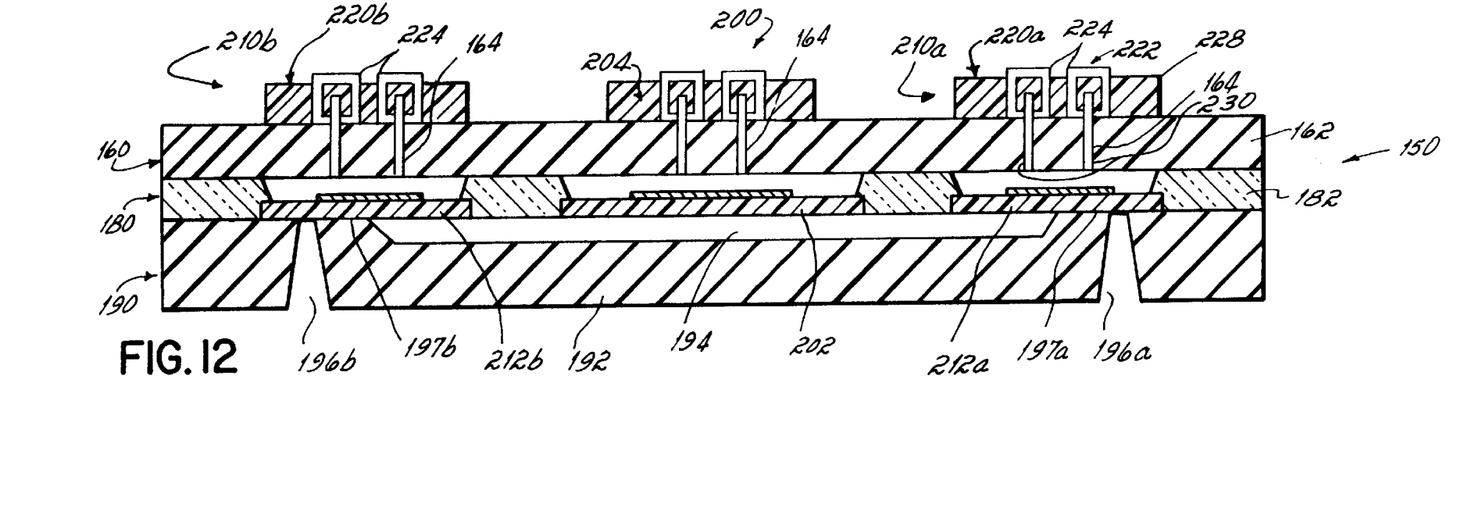

It should be appreciated that other electromagnetic driver designs may be utilized with the various embodiments of the invention. For example, FIGS. 11 and 12 illustrate another micropump 150 consistent with the principles of the invention, which utilizes a bar- or solenoid-type inductor in lieu of a spiral coil. Similar to microvalve 100, micropump 150 includes an electromagnetic driver assembly 160, diaphragm assembly 180 and pump body assembly 190. Micropump 150 is further functionally separated into a pump actuator 200 and two microvalve actuators 210a, 210b.

Initially deferring a discussion of driver assembly 160, diaphragm assembly 180 includes a glass substrate 182 into which has been formed a series of magnetic diaphragms 202, 212a, 212b associated respectively with pump actuator 200 and valve actuators 210a, 210b. Each diaphragm may include a polyimide base and permalloy magnetic core, similar to diaphragm assembly 130 of microvalve 100. In addition, pump body assembly 190 includes a silicon substrate 192 into which has been etched a pump chamber 194 and inlet/outlet ports 196a, 196b. Valve seats 197a, 197b mate with diaphragms 212a, 212b in valve actuators 210a, 210b. Fabrication of assemblies 180, 190 may occur in generally the same manner as assemblies of 130, 140 of microvalve 100, and bonding of the various assemblies may also occur through the same electrostatic bonding process used for microvalve 100. Through peristaltic actuation of pump actuator 200 and valve actuators 210a, 210b, bidirectional pumping between ports 196a, 196b may be obtained in a similar manner to micropump 10.

Now referring to driver assembly 160, a silicon substrate 162 includes a plurality of through holes 164 filled with magnetically permeable material such as permalloy similar to driver assembly 110 of microvalve 100. Instead of spiral-type electromagnetic drivers, however, a series of bar- or solenoid-type electromagnetic drivers 204, 220a, and 220b are fabricated on substrate 162.

As shown in FIG. 11, each driver includes a pair of u-shaped magnetic cores which extend in opposite directions from one another along an axis oriented generally along the longitudinal axis of the micropump. Each core includes an associated conductive coil having a helical winding that circumscribes the core. The coils for each driver are electrically coupled in parallel.

Figure 13:
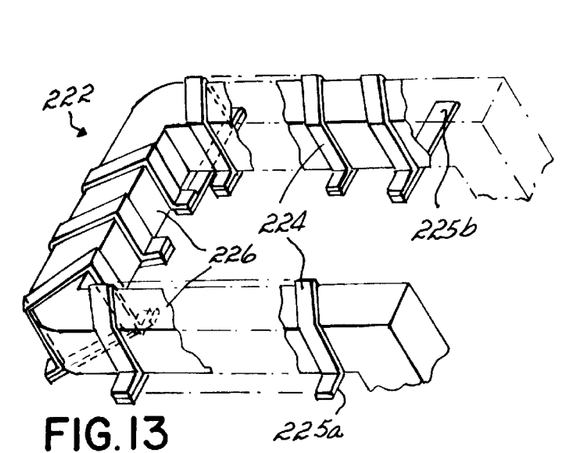
FIG. 13 is a schematic perspective view of a magnetic core/conductive coil assembly from the micropump of FIGS. 11 and 12, with the insulator layer therein removed.

FIG. 13 illustrates one magnetic core/conductive coil assembly 222, e.g., for use in driver 220a. It should be appreciated that the other assembly in driver 220a, as well as the assemblies in drivers 204 and 220b may be similarly configured. Assembly 222 includes a continuous helical conductive coil 224 wound around a u-shaped magnetic core 226 having a pair of parallel legs coupled at ends thereof through a transverse leg. A pair of lead wires 225a, 225b terminate the ends of coil 224, whereby an electric potential may be applied across the lead wires 225a, 225b to generate an electromagnetic force with the driver.

U-shaped magnetic core 226 is circumscribed by helical coil 224 and is electrically insulated therefrom by an insulator layer 228. Assembly 222 is also partially encapsulated by insulator layer 228. Each end of magnetic core 226 terminates proximate a central point of the associated diaphragm and extends toward the associated diaphragm through a downward facing magnetic via 230. Similar to microvalve 100, vias 230 may also optionally extend through a through hole 164 formed in substrate 162 as shown in FIG. 11 to reduce the gap between the driver and the diaphragm. It has been found that this type of driver provides excellent attractive force, also with little leakage of magnetic flux. In addition, this driver design assists in precisely locating the magnetic flux relative to the diaphragm. Further, the driver has reduced power consumption due to a relatively lower resistance.

One manner of fabricating drive assembly 160 is illustrated in FIGS. 14A–14F. It should be appreciated that only one leg of magnetic core 226 is illustrated in these figures. As discussed above, a silicon substrate 162 is utilized as the base substrate, although other materials such as glass may also be used. In addition, as shown in FIG. 11, prior to the process illustrated in FIGS. 14A–14F, substrate 162 may optionally be patterned and etched to form through holes, and a magnetically permeable material such as permalloy may be deposited in the through holes to extend the magnetic vias of the driver through the substrate.

Figure 14A:
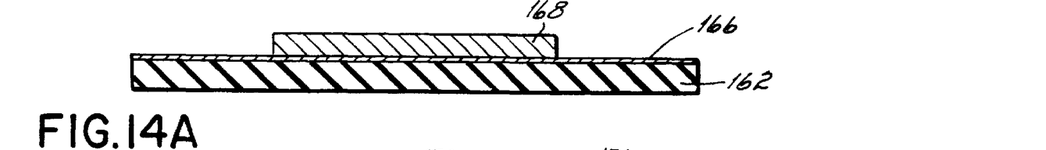
FIGS. 14A–14F are schematic cross-sectional views illustrating the fabrication of an electromagnetic driver from the micropump of FIGS. 11 and 12, with only one leg of one magnetic core/conductive coil assembly therein shown.
Figure 14B:
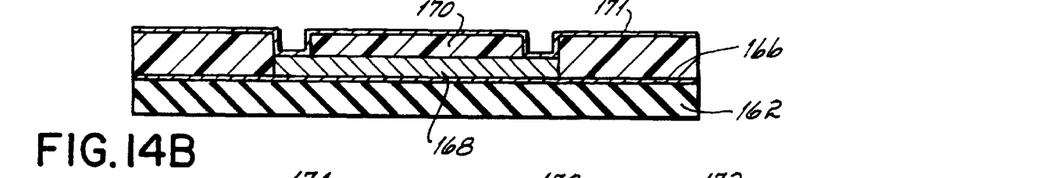

First, as shown in FIG. 14A, a seed layer 166, e.g., titanium (300 Å)/copper (3000 Å)/titanium (300 Å) or chromium (300 Å)/copper (3000 Å)/chromium (200 Å), is electron beam evaporated on substrate 162. In addition, a copper layer 168 is electroplated through a photoresist mask (not shown) to form the bottom winding segments of coil 224. Next, as shown in FIG. 14B, a second photoresist mask 170 is deposited and patterned to form a base upon which to later deposit magnetic core 226 in an overlapping but electrically isolated relationship from copper layer 168. Mask 170 is cured at an elevated temperature to form a cured insulator, and another seed layer 171 is then electron beam evaporated onto mask 170, in the same general manner as seed layer 166.

Figure 14C:
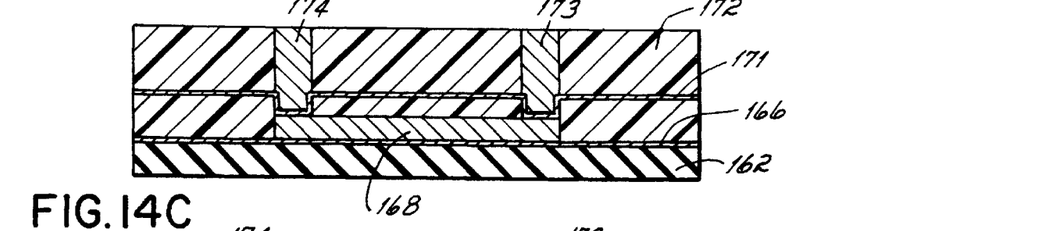
Figure 14D:
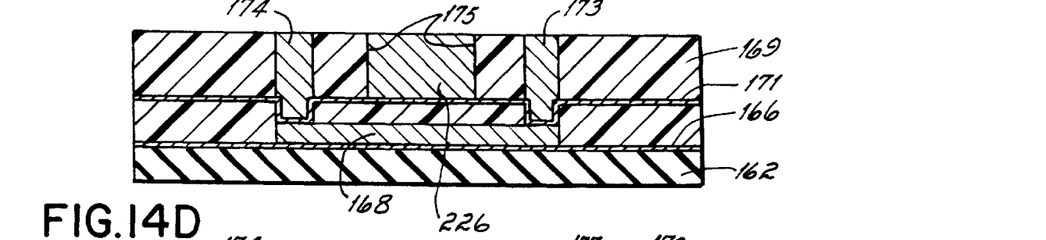

Next, as shown in FIG. 14C, a third photoresist mask 172 is deposited and patterned to form a mold for forming upstanding winding segments of coil 224. Copper is then electroplated through the mask to form segments 173 and 174 electrically coupled to copper layer 168. Next, in FIG. 14D, mask 172 is removed and a fourth photoresist mask 169 is deposited and patterned to form a mold through which a magnetically permeable material such as Ni—Fe (81%/19%) permalloy is electroplated to form core 226.

Figure 14E:
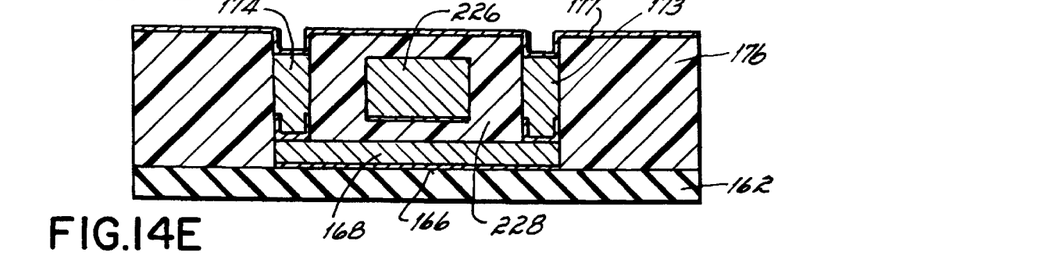
Figure 14F:
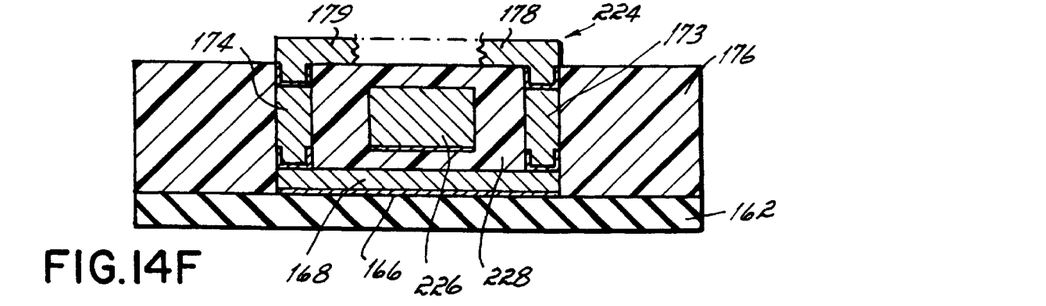

Next, as shown in FIG. 14E, exposed portions of masks 170 and 169 are etched away and a fifth photoresist mask 176 is deposited, patterned, and cured to form the upper and upstanding portions of insulator layer 228 and thereby fully circumscribe magnetic core 226. Next, a seed layer 177, similar to seed layers 166 and 171, is deposited over mask 176. Next, in FIG. 14F, a copper layer 178 is electroplated over seed layer 177 to form top winding segments of coil 224 respectively coupling upstanding segments 173 and 174 to adjacent winding segments in the coil (illustrated by separate upper winding segments 178 and 179). Fabrication of the driver is then complete. It should be appreciated, however, that various alternate materials, processing technologies, etc. may be used in the alternative to manufacture the driver consistent with the invention.

One suitable driver configuration utilizes a pair of core/coil assemblies with a permalloy magnetic core being 300 microns wide×100 microns thick×1 cm in overall length and separated via AZ-4000 photoresist insulator from a helical coil of 50 micron wide×50 micron thick copper segments that form 80 turns around the core. Other dimensions, numbers of turns, materials, etc. may be used consistent with the invention.

Another alternative pump design consistent with the invention utilizes a pump actuator in conjunction with a pair of undriven flap or check valves formed in a silicon substrate. In such a design, only one pump actuator is required, although bidirectional flow is typically not possible.

The above-described embodiments have a number of significant advantages. For example, in many applications, the drive voltage may be reduced to a range matching that of the electronic circuitry associated with the device (e.g., 1–5 volts), thereby minimizing the amount of power supply circuitry required for the overall system. Further, in many applications the power requirements of the microactuated devices may be reduced to a level that is compatible with a battery-driven power supply, a feature that is often not possible with many conventional microactuated devices.

Various additional modifications may be made to the illustrated embodiments without departing from the spirit and scope of the invention. Therefore, the invention lies solely in the claims hereinafter appended.

What is claimed is:

1. A microactuated device, comprising:

(a) a substrate;

(b) a magnetically permeable diaphragm coupled to the substrate; and (c) an electromagnetic inductor coupled to the substrate in a generally parallel and overlapping relationship relative to the diaphragm, with the diaphragm disposed within a magnetic field generated by the electromagnetic inductor.

2. The device of claim 1, wherein the electromagnetic inductor is configured to receive an input signal and thereby generate an attractive force that draws the diaphragm toward the inductor; whereby the electromagnetic inductor operates as a driver.

3. The device of claim 2, wherein the substrate includes a valve seat coupled to a port, and wherein the diaphragm is configured to form a seal with the valve seat in one operative position; whereby the device is a microvalve.

4. The device of claim 3, wherein the diaphragm further includes a boss which forms the seal with the valve seat.

5. The device of claim 3, wherein the substrate includes a second port, with the valve seat defined between the first and second ports, and wherein a side of the diaphragm facing away from the electromagnetic inductor forms a generally planar mating surface that overlaps the valve seat and the first and second ports when the diaphragm is in the operative position.

6. The device of claim 2, wherein the substrate includes an internal chamber having first and second ports coupled thereto, and wherein the diaphragm is configured to vary the volume of the internal chamber; whereby the device is a micropump.

7. The device of claim 6, further comprising first and second microvalves coupled to the substrate with the internal chamber interposed therebetween, each microvalve including a valve seat formed in the substrate and interposed between the internal chamber and a port, a magnetically permeable diaphragm configured to form a seal with the valve seat in one operative position to block fluid flow between the internal chamber and the port, and an electromagnetic inductor overlapping the diaphragm and configured to receive an input signal to generate an attractive force that unseats the diaphragm from the valve seat.

8. The device of claim 1, wherein the substrate includes silicon, and wherein the diaphragm includes a silicon base layer integrally formed in the substrate.

9. The device of claim 1, wherein the substrate includes glass, and wherein the diaphragm includes a polyimide base layer deposited within a recess in the substrate.

10. The device of claim 1, wherein the diaphragm includes a base layer formed of a non-magnetically permeable material and a magnetic core layer disposed thereon and formed of a magnetically permeable material.

11. The device of claim 10, wherein the magnetic core layer includes permalloy.

12. The device of claim 1, wherein the electromagnetic inductor includes a conductive coil electrically isolated from a magnetic core.

13. The device of claim 12, wherein the magnetic core includes a plurality of magnetic vias extending generally toward the diaphragm to direct magnetic flux at the diaphragm.

14. The device of claim 13, wherein the substrate includes a plurality of through holes, and wherein magnetic vias from the magnetic core extend into each of the plurality of through holes.

15. The device of claim 14, wherein the through holes fully extend through the substrate.

16. The device of claim 12, wherein the coil includes copper and the magnetic core includes permalloy.

17. The device of claim 12, wherein the coil includes a plurality of segments forming a spiral oriented generally parallel to the diaphragm, and wherein the magnetic core at least partially encapsulates the coil in a direction facing away from the diaphragm.

18. The device of claim 12, wherein the magnetic core includes a bar extending generally parallel to the diaphragm, and wherein the coil includes a helical winding circumscribing the bar.

19. The device of claim 18, wherein the magnetic core is u-shaped, having a pair of parallel legs coupled at ends thereof through a transverse leg.

20. A microactuated device, comprising:

(a) a substrate;

(b) a magnetically permeable diaphragm coupled to the substrate, the diaphragm including a magnetically permeable magnetic core layer disposed on a non-magnetically permeable base layer; and (c) an electromagnetic inductor coupled to the substrate with the diaphragm disposed within a magnetic field generated thereby.

21. The device of claim 20, wherein the electromagnetic inductor is configured to receive an input signal and thereby generate an attractive force that draws the diaphragm toward the inductor; whereby the electromagnetic inductor operates as a driver.

22. The device of claim 20, wherein the electromagnetic inductor is coupled to the substrate in a generally parallel and overlapping relationship relative to the diaphragm.

23. The device of claim 20, wherein the magnetic core layer includes permalloy, and wherein the base layer includes silicon or glass.

24. A micropump comprising:

(a) a pump body formed in a substrate and including a pump chamber and a magnetically permeable diaphragm movable between first and second operative positions to vary the volume of the pump chamber; and (b) an electromagnetic pump driver coupled to the pump body in a generally parallel and overlapping relationship relative to the diaphragm to selectively apply an electromagnetic force and thereby drive the diaphragm between its first and second operative positions.

25. The micropump of claim 24, further comprising:

(a) first and second valve bodies formed in the substrate, each including a valve chamber in fluid communication with the pump chamber and a magnetically permeable diaphragm configured to move between first and second operative positions to selectively place the valve chamber in fluid communication with an external port; and (b) first and second electromagnetic valve drivers coupled respectively to the first and second valve bodies in generally parallel and overlapping relationships relative to the respective diaphragms to selectively apply electromagnetic forces to drive the respective diaphragms between their first and second operative positions.

26. A microvalve comprising:

(a) a valve body formed in a substrate and including a valve seat and a magnetically permeable diaphragm movable between first and second operative positions, the diaphragm forming a seal with the valve seat in the first operative position; and (b) an electromagnetic valve driver coupled to the valve body in a generally parallel and overlapping relationship relative to the diaphragm to selectively apply an electromagnetic force and thereby drive the diaphragm between its first and second operative positions.

27. A method of making an electromagnetic microactuated device, the method comprising:

(a) forming an electromagnetic inductor on a first substrate;

(b) forming a magnetically permeable diaphragm on a second substrate, the diaphragm being movable at least between first and second operative positions; and (c) bonding the first and second substrates together in an overlapping relationship to orient the electromagnetic driver generally parallel to and overlapping the magnetically permeable diaphragm.

28. The method of claim 27, wherein forming the electromagnetic inductor includes:

(a) depositing a coil of conductive material on the first substrate;

(b) depositing a magnetic core of magnetically permeable material at least partially overlapping the coil; and (c) forming an insulator layer electrically isolating the coil from the magnetic core.

29. The method of claim 28, wherein the coil is deposited with a plurality of segments forming a spiral, and wherein the magnetic core encapsulates the coil in a direction facing away from the diaphragm.

30. The method of claim 28, wherein forming the insulator layer includes:

(a) depositing a photoresist over the coil;

(b) patterning the photoresist to encapsulate the coil; and (c) curing the photoresist.

31. The method of claim 28, wherein patterning the photoresist includes defining a plurality of vias extending through the insulator layer to the first substrate, and wherein depositing the magnetic core includes depositing the magnetically permeable material in the plurality of vias to form magnetic vias.

32. The method of claim 28, further comprising forming a plurality of through holes in the first substrate, and filling the through holes with magnetically permeable material electrically coupled to the magnetic core.

33. The method of claim 32, wherein the plurality of through holes are formed and filled prior to deposition of the coil and the magnetic core.

34. The method of claim 28, wherein depositing the coil includes depositing a seed layer and electroplating copper over the seed layer.

35. The method of claim 28, wherein depositing the magnetic core includes depositing a seed layer and electroplating permalloy over the seed layer.

36. The method of claim 27, wherein forming the electromagnetic inductor includes:

(a) depositing a first layer of conductive material on the first substrate to form bottom winding segments of a helical coil;

(b) forming a first insulator layer over the first layer of conductive material;

(c) depositing a second layer of conductive material into vias formed in the first insulator layer to form upstanding winding segments of the helical coil, wherein the second layer of conductive material is electrically coupled to the first layer of conductive material through the vias in the first insulator layer;

(d) depositing a bar of magnetically permeable material over the first insulator layer to form a magnetic core;

(e) forming a second insulator layer over the magnetic core and between the magnetic core and the upstanding winding segments of the helical coil; and (f) depositing a third layer of conductive material over the second insulator layer and through vias formed in the second insulator layer to form top winding segments of the helical coil, wherein the third layer of conductive material is electrically coupled to the second layer of conductive material through the vias in the second insulator layer.

37. The method of claim 36, wherein the helical coil and magnetic core define a first core/coil assembly, the method further comprising forming a second core/coil assembly extending along a longitudinal axis of the first core/coil assembly.

38. The method of claim 36, further comprising forming a plurality of through holes in the first substrate, filling the through holes with magnetically permeable material to form magnetic vias, and electrically coupling the magnetic vias to the magnetic core.

39. The method of claim 36, wherein forming the electromagnetic inductor includes forming the magnetic core in a u-shape, with a pair of parallel legs coupled at ends thereof through a transverse leg.

40. The method of claim 27, wherein forming the diaphragm includes depositing a layer of magnetically permeable material over a non-magnetically permeable base layer.

41. The method of claim 40, wherein the magnetically permeable material includes permalloy.

42. The method of claim 41, wherein the permalloy is electroplated, and wherein forming the diaphragm includes depositing a seed layer prior to electroplating the permalloy.

43. The method of claim 40, wherein the second substrate includes a silicon substrate, and wherein forming the diaphragm includes etching the silicon substrate to define the base layer of the diaphragm.

44. The method of claim 43, wherein the silicon substrate is etched via bulk anisotropic etching.

45. The method of claim 43, further comprising bonding the silicon substrate to a second silicon substrate, and etching the second silicon substrate to define a valve seat thereon, wherein etching the first silicon substrate includes forming a boss on the diaphragm that is configured to form a seal with the valve seat when the diaphragm is oriented in the first operative position.

46. The method of claim 45, wherein bonding the first and second silicon substrates includes depositing a gold layer on mating surfaces of each silicon substrate and laminating the silicon substrates together to form a eutectic bond.

47. The method of claim 40, wherein the second substrate includes a glass substrate, and wherein forming the diaphragm includes depositing polyimide within a recess formed in one side of the glass substrate and etching an opening on the other side of the glass substrate to suspend the diaphragm therein.

48. The method of claim 47, wherein a side of the diaphragm facing away from the electromagnetic inductor forms a generally planar mating surface, and wherein the method further comprises etching a valve seat into a silicon substrate, and bonding the silicon substrate to the glass substrate such that the diaphragm seals the valve seat along the mating surface when the diaphragm is oriented in the first operative position.

49. The method of claim 27, wherein the first substrate includes glass and the second substrate includes silicon, and wherein bonding the first and second substrates is performed via electrostatic bonding.

50. The method of claim 27, further comprising bonding a third substrate to the second substrate, the third substrate including a pump body component.

51. The method of claim 27, further comprising bonding a third substrate to the second substrate, the third substrate including a valve body component.

52. The method of claim 27, wherein the first and second substrates are disposed on wafers, and wherein forming the electromagnetic inductor on the first substrate, forming the magnetically permeable diaphragm on the second substrate, and bonding the first and second substrates together are performed via batch wafer processing.

* * * * *